(12) United States Patent
Kaminsky et al.

(10) Patent No.: US 7,743,109 B2
(45) Date of Patent: Jun. 22, 2010

(54) REDUCING ROUND TRIPS ACROSS A WIDE AREA NETWORK FOR RESOURCE LOCKING BY EXTENDED LOCKING AND DELAYED UNLOCKING

(75) Inventors: Daniel Kaminsky, Sunnyvale, CA (US); Evgeny Panman, Hadera (IL); Ophir Romano, Pardesia (IL); Israel Ben-Shaul, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 705 days.

(21) Appl. No.: 11/701,139

(22) Filed: Jan. 31, 2007

(65) Prior Publication Data

US 2007/0143477 A1 Jun. 21, 2007

Related U.S. Application Data

(63) Continuation-in-part of application No. 11/408,260, filed on Apr. 20, 2006, which is a continuation of application No. 10/485,178, filed on Jul. 28, 2004, now Pat. No. 7,139,811.

(60) Provisional application No. 60/309,050, filed on Aug. 1, 2001, provisional application No. 60/331,582, filed on Nov. 20, 2001, provisional application No. 60/338,593, filed on Dec. 11, 2001.

(51) Int. Cl.
*G06F 13/00* (2006.01)

(52) U.S. Cl. ............... 709/214; 709/210; 709/219; 707/8

(58) Field of Classification Search ............... 709/208, 709/210, 211, 213, 214, 217, 219, 250; 707/8
See application file for complete search history.

(56) References Cited

U.S. PATENT DOCUMENTS

| | | | |
|---|---|---|---|
| 5,611,049 A | 3/1997 | Pitts | |
| 5,734,909 A * | 3/1998 | Bennett | ............ 710/200 |
| 5,862,325 A | 1/1999 | Reed et al. | |
| 5,926,834 A | 7/1999 | Carlson et al. | |
| 5,987,506 A | 11/1999 | Carter et al. | |
| 6,085,234 A | 7/2000 | Pitts et al. | |
| 6,108,703 A | 8/2000 | Leighton et al. | |
| 6,119,151 A | 9/2000 | Cantrell et al. | |
| 6,185,598 B1 | 2/2001 | Farber et al. | |
| 6,195,650 B1 | 2/2001 | Gaither et al. | |

(Continued)

OTHER PUBLICATIONS

P. Mockapertis, Request for Comments: 1035, entitled: "Domain Names—Implementation and Specification", Nov. 1987, 55 pages.

(Continued)

*Primary Examiner*—Viet Vu
(74) *Attorney, Agent, or Firm*—Abelman, Frayne & Schwab

(57) ABSTRACT

A locking mechanism for a data resource is disclosed, which can operate across LANs and a WAN. The technique temporarily imposes an extended lock on the requested data resource. While the extended lock is in force, all lock and unlock requests issued by the same client for the resource are managed exclusively by the local server. Once the last lock has been released, or after a timeout interval, the extended lock is canceled. Traffic across the WAN is reduced to a minimum of one round trip.

24 Claims, 6 Drawing Sheets

U.S. PATENT DOCUMENTS

| | | | |
|---|---|---|---|
| 6,317,777 | B1 | 11/2001 | Skarbo et al. |
| 6,356,863 | B1 | 3/2002 | Sayle |
| 6,430,624 | B1 | 8/2002 | Jamtgaard et al. |
| 6,484,143 | B1 | 11/2002 | Swildens et al. |
| 6,574,618 | B2 | 6/2003 | Eylon et al. |
| 6,604,106 | B1 | 8/2003 | Bodin et al. |
| 6,718,372 | B1 | 4/2004 | Bober |
| 6,748,502 | B2 | 6/2004 | Watanabe et al. |
| 6,757,769 | B1 * | 6/2004 | Ofer .......................... 710/200 |
| 7,139,811 | B2 | 11/2006 | Lev Ran et al. |
| 7,376,744 | B2 * | 5/2008 | Loaiza et al. ............... 709/229 |
| 2004/0210604 | A1 | 10/2004 | Li et al. |

OTHER PUBLICATIONS

R. Fielding, et al., Request for Comments: 2616, entitled: "Hypertext Transfer Protocol—HTTP/1.1", Jun. 1999, 114 pages.

BIND 9 Administrator Reference Manual (ARM), Version 9, Sep. 2000, Internet Software Consortium, Redwood City, CA, 96 pages.

Pawlowski, et al., "The NFS Version 4 Protocol", published at the System Administration and Networking (SANE) Conference (May 22-25, 2000 MECC, Maastricht, The Netherlands).

Braam, et al., "Removing bottlenecks in distributed filesystems: Coda and Intermezzo as examples", published in the proceedings of Linux Expo 1999 (May 1999).

Guy, et al., "Implementation of the ficus replicated file system", Proceedings of the Summer USENIX Conference (Anaheim, CA, Jun. 1990), pp. 63-71.

Page, et al., Perspectives on optimistically replicated, peer-to-peer filing>>, Software: Practice and Experience 28(2), 1998, pp. 155-180.

Labrinidis, et al., "Generating dynamic content at database-backed web servers: cgibin vs. mod_perl", SIGMOD Record, vol. 1, Mar. 2000, pp. 26-31.

U.S. Appl. No. 60/309,050 (published).

U.S. Appl. No. 60/331,582 (published).

U.S. Appl. No. 60/338,593 (published).

* cited by examiner

REDUCING ROUND TRIPS ACROSS A WIDE AREA NETWORK FOR RESOURCE LOCKING BY EXTENDED LOCKING AND DELAYED UNLOCKING

CROSS-REFERENCE TO RELATED APPLICATIONS

This application is a continuation-in-part of U.S. application Ser. No. 11/408,260, filed Apr. 20, 2006 which is a continuation of U.S. application Ser. No. 10/485,178 filed Jul. 28, 2004 (now U.S. Pat. No. 7,139,811), which claims the benefit of U.S. Provisional Patent Applications Nos. 60/309,050, filed Aug. 1, 2001; 60/331,582, filed Nov. 20, 2001; and 60/338,593, filed Dec. 11, 2001. All of the above related applications are incorporated herein by reference.

BACKGROUND OF THE INVENTION

1. Field of the Invention

This invention relates to client-server communications. More particularly, this invention relates to reduction in network traffic in the management of locks on server-based resources.

2. Description of the Related Art

TABLE 1

Acronyms and Abbreviations

| | |
|---|---|
| CIFS | Common Internet File System |
| FTP | File Transfer Protocol |
| HTTP | Hypertext Transfer Protocol |
| HTTPS | HyperText Transfer Protocol Secure sockets |
| LAN | Local Area Network |
| NFS | Network File System |
| NLM | Network Lock Manager |
| OSI | Open System Interconnection |
| URL | Uniform Resource Locator |
| VFN | Virtual File Network |
| VPN | Virtual Private Network |
| WAAS | Wide Area Application Services |
| WAE | Wide Area Application Engine |
| WAN | Wide Area Network |

Geographically dispersed enterprises often deploy distributed computer systems in order to enable information sharing throughout the enterprise. Such distributed systems generally comprise a number of local area networks (LANS) that are connected into one or more wide area networks (WANs). Enterprises have commonly used dedicated leased lines or permanent virtual circuits, such as frame relay links, to connect their LAN and WAN end-points. While providing generally predictable bandwidth and quality of service, such interconnections are often expensive and represent fixed costs for an enterprise. In addition, when interconnecting over wide areas, inherent latency is introduced in the network, regardless of the bandwidth. More recently, with the development of the Internet, many enterprises use virtual private networks (VPNs) operating over the public Internet, at least for a portion of their data traffic. Although VPNs are typically less expensive than dedicated lines, bandwidth and latency are often unpredictable, particularly when transmitting large files over long distances.

Many LANs include one or more dedicated file servers that receive data from other computers on the LAN via the network for storage on the file servers' hard disks, and supply data from the file servers' hard disks to the other processors via the network. Data stored on file servers is often accessed using a distributed file system, e.g., Network File System (NFS), primarily used for UNIX clients, or Common Internet File System (CIFS), primarily used for Windows clients.

While such networked arrangements are convenient for sharing of information among users throughout the enterprise, there is a significant disadvantage in that software applications that access data resources are primarily designed to access the data resources over a relatively high-speed LAN. Usually, significant latency and performance degradation are observed when a software application accesses a data resource that is located across the WAN in a remote LAN. In a typical example, an enterprise user in a branch office uses a word-processing application to access and modify files. Usually, operations on files that are in the LAN local to the user are relatively quick, while operations on files that are located across the WAN are relatively slow and sometimes unreliable.

The NFS Version 4 protocol implements leases for locks. This feature is described by Pawlowski et al., in "The NFS Version 4 protocol," published at the System Administration and Networking (SANE) Conference (May 22-25, 2000 MECC, Maastricht, The Netherlands), which is incorporated herein by reference. This paper is available at, the URL "www.nluug.nl/events/sane2000/papers/pawlowski.pdf".
Leases or token-based state management also exists in several other distributed file systems.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Software programming code, which embodies aspects of the present invention, is typically maintained in permanent storage, such as a computer readable medium. In a client-server environment, such software programming code may be stored on a client and a server. The software programming code may be embodied on any of a variety of known media for use with a data processing system. This includes, but is not limited to, magnetic and optical storage devices such as disk drives, magnetic tape, compact discs (CDs), digital video discs (DVDs), and computer instruction signals embodied in a transmission medium with or without a carrier wave upon which the signals are modulated. For example, the transmission medium may include a communications network, such as the Internet. In addition, while the invention may be embodied in computer software, the functions necessary to implement the invention may alternatively be embodied in part or in whole using hardware components such as application-specific integrated circuits or other hardware, or some combination of hardware components and software.

DEFINITIONS

Wide Area Network (WAN), as used in the specification and the claims, is to be understood as a geographically dispersed network connecting two or more LANs. Many different WAN configurations are possible, including WANs using dedicated leased lines, permanent virtual circuits (such as frame relay links), WAAS systems, virtual private networks (VPNs) (which typically operate over the public Internet), and/or satellite links. A WAN sometimes comprises an intranet (a private network contained within an enterprise, which uses Internet protocols) and/or an extranet (part of an intranet that has been extended to users outside the enterprise). "WAN" is also to be understood as comprising the public Internet. "Resource," as used in the specification and the claims, is to be understood as including, but not being limited to, files, content, directories, and file metadata.

Overview.

Figure 1:
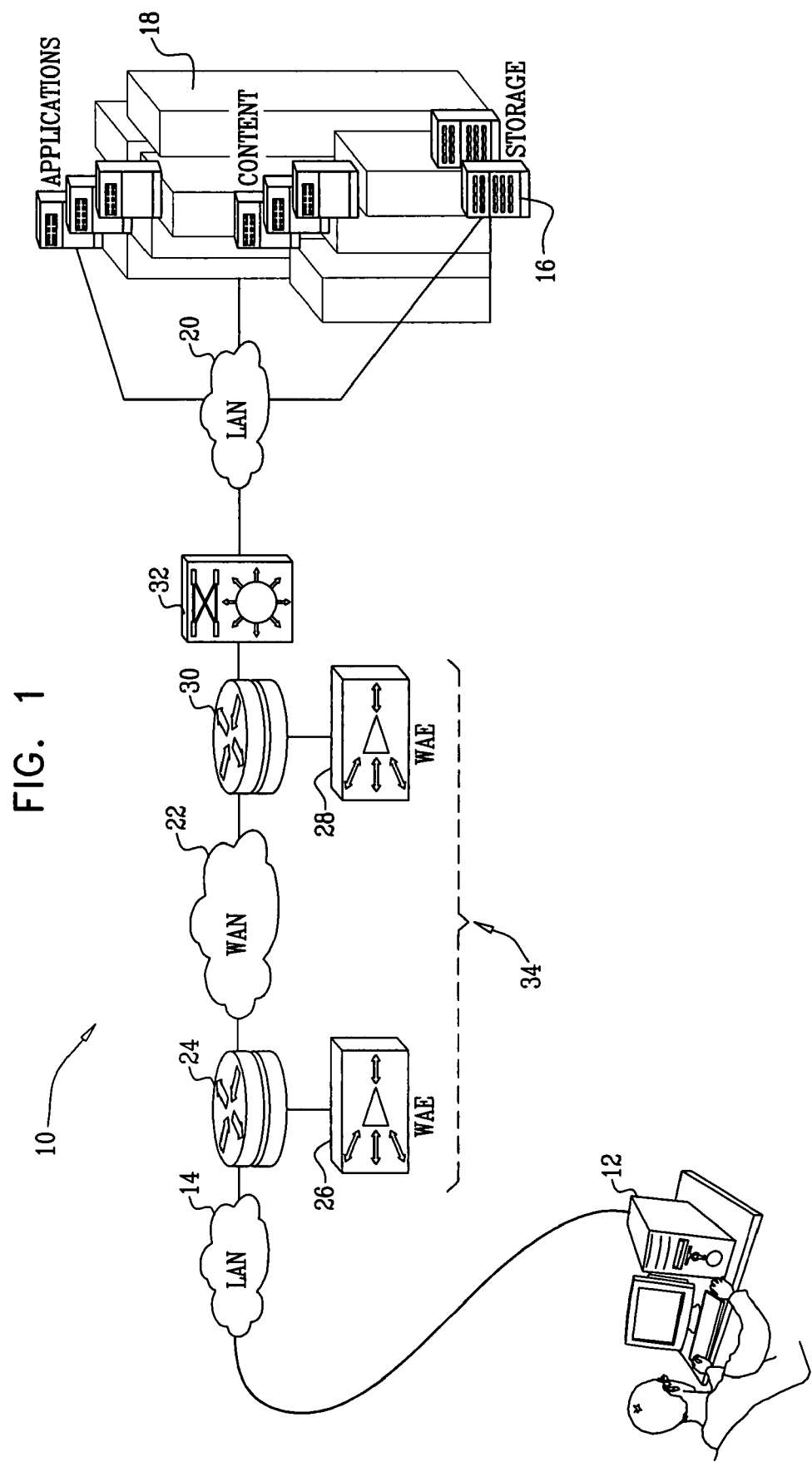
FIG. 1 is a block diagram that schematically illustrates a distributed computer system, in accordance with a disclosed embodiment of the invention.

In embodiments of the present invention, a distributed computer system comprises two or more geographically-remote local area networks interconnected into a wide area network. Reference is now made to FIG. 1, which is a pictorial illustration of a system 10, which is suitable for carrying out embodiments of the invention. The system 10 is supported by Wide Area Application Services technology (WAAS), available from Cisco Systems, Inc., 170 West Tasman Dr., San Jose, Calif. 95134, and is suitably configured to incorporate the inventive techniques herein disclosed.

The system 10 is exemplary. The principles of the invention can also be applied to other distributed systems; for example, virtual file sharing networks (VFN). Indeed, the principles of the invention are generically applicable beyond file servers. They can be applied to any application servers that use locks to protect access to resources. The main restriction is that the locking mechanism and locked resources have the notion of "range", so that a lock can apply to a specific range within a locked resource, as opposed to the entire resource. While a byte range is presented in the example herein, the notion of range can be applied, for example, to a subset of records in a database, or certain fields of an object in some object-based store.

The system 10 supports any number of clients, shown representatively in FIG. 1 as a client 12, which is located on a LAN 14. One or more file servers, represented by a remote file server 16, are in a data center 18, linked via a LAN 20. The LANs 14, 20 constitute interfaces to a wide area network 22. This arrangement enables the client 12 to efficiently access resources held in the data center 18.

In some embodiments, on the client side, the LAN 14 connects to a router 24, which is linked to a local wide area application engine 26 (WAE), which communicates via the wide area network 22 with a remote wide area application engine 28, similarly linked to a switch or router 30 that serves the data center 18.

In some embodiments, on the server side, the LAN 20 is provided with a switch 32, which can be realized as a catalyst switch, available from Cisco.

The wide area application engines 26, 28 run WAAS software to transparently intercept and forward traffic across the wide area network 22. The WAN is thus implemented as an optimized architecture 34, consisting of the wide area application engines 26, 28, routers 24, 30 and the wide area network 22. The architecture 34, facilitated by the WAAS software, eliminates transmission of unnecessary data, and compresses data that is transmitted across the wide area network 22.

To eliminate the problem of response latency across the wide area network 22, the wide area application engines 26, 28 support application adapters, which function as local OSI Layer 7 application-specific protocol proxies. This optimization enables client/server protocol messages to be processed locally by the wide area application engines 26, 28 where appropriate and safe, rather than requiring multiple roundtrips over the wide area network 22. The principles of the invention applied to the architecture 34 exploit and enhance these optimizations to produce even greater system performance.

In order to fulfil a request issued by the client 12 to the remote file server 16 for some data resource, the wide area application engine 26 attached to the LAN 14 transmits the request over the wide area network 22 to the remote wide area application engine 28. The remote wide area application engine 28 then arranges for the remote file server 16 to be accessed, and arranges for return of accessed information to the client 12. The system 10 may be viewed as a "double-proxy" system, in which file system requests are intercepted by the local gateways, which fulfill the requests by communicating with remote gateways. This architecture enables clients and file servers to interact transparently via their standard native network file system interfaces, without the need for special client or server software. A single system may simultaneously support multiple native file systems and network protocols.

Concurrency Control.

The wide area application engines 26, 28 preferably provide full native network file system functionality to the client 12, including support for external application-generated lock requests. Support of leases for consistency and support of locks for concurrency are essentially unrelated functions, although there are certain similarities of implementation. Locks can be viewed as a special type of lease. Consistency is an internal system function, while locks are supported to provide a service to external user applications. Preferably, file locking is supported for multiple operating systems, including support for the UNIX NLM (Network Lock Manager, the NFS network locking manager), and the Win32API access modes and sharing modes for files in Windows.

File locking is used by processes to synchronize access to shared data. File systems typically provide whole file or byte-range locking of two types: mandatory and advisory (also called discretionary). Mandatory locking is enforced by the file system. It prevents all processes, except those of the lock holder, from accessing the locked file. Advisory locking prevents others from locking a file (or a range within the file), but does not prevent others from accessing the file if they access the file without a lock request. Thus, it is effective only between cooperative processes.

The system 10 supports both mandatory locking, as is used in the Common Internet File System (CIFS), and advisory locking, as is used in NFS. Both mechanisms are used to support lock requests from user applications. Most preferably, byte-range locking is supported, as well, for both CIFS and NLM. Optionally, the system 10 supports interoperating CIFS and NLM file locking and sharing operations. When such support is provided, operations contending for the same resource must adhere to the stricter locking paradigm, i.e., mandatory locking, while maintaining the correct operation of other clients.

Locks may have the following data structure:

Lock={object id, client id, grant time, duration, epoch, range}, wherein the identifier object id represents the identity of the resource to which the lock applies, using the internal resource identification numbers of the WAAS system. For lock clients, the identifier client id denotes the peer lock server from which the lock request was received. For lock servers, the identifier client id denotes the process on the client 12 that requested the lock. Grant time and duration are used for automatic lock expiration, as described below. The identifier epoch is an identification of a specific application instance (comprising, for example, one or more of the following parameters: machine id, process-id, process creation time, or a random value). Epoch identifiers are used to facilitate coordination of a shared state in a distributed application. They are used to determine if the shared state was created by the instance with which an application is currently communicating (for example, in the case of a reconnect) or a previous instance (for example, in the case of a restart). The identifier range indicates what range in the file is to be locked. For example, a lock request on a file may apply to range to bytes in the range of 100-200, meaning only bytes 100 through 200 in the file are being locked.

Lock Service.

In general, WAAS accelerates protocols only in a safe manner, i.e., as long as it preserves the semantics of the underlying protocol being accelerated. In addition, WAAS is transparent to clients and servers in the sense that they are not aware of the existence of wide area application engines, and therefore they do need to be changed in order to work in a WAE-enabled system. In particular, as far as lock protocols are concerned, WAAS never compromises the semantics of a lock in the sense that a lock request issued by a client with WAAS has at least the same level of protection as it would have when issued natively over the WAN (without involvement of WAAS). Lock service according to the invention is also transparent to the user.

In some embodiments, a lock client (not shown) may track outstanding locks using the following data structure for each lock issued:

Map={lock id, lock}.

The identifier "Lock id" is unique for each lock issued, and the identifier "lock" is a lock object.

In order to maintain a lock on a file, operating systems generally require that the file handle for the file remain open. Therefore, in order to maintain locks on files, locked files are kept open on the file server.

Locking in the system 10 may use at-least-once semantics. By this is meant that a lock/unlock call executes at least once as long as the server machine does not fail, and continues to execute until an acknowledgement is received. If one or more acknowledgements are lost, the wide area application engine 26 may execute the same call multiple times. Reissuing a held lock to the same client is generally not harmful since it is an idempotent operation. An exception to this generalization is the use of reference counting of locks by an originator, in which case a single response to each request is preferably ensured. When using at-least-one semantics, the protocol between a lock server and lock client typically does not need to ensure a reliable WAN connection because retransmissions are permitted.

In some embodiments, the system 10 implements internal delays when executing unlock operations in order to reduce latency in access to the remote file server 16. End-user applications typically request repeated locks for the same or overlapping regions of a file. Each lock operation is typically followed by an unlock operation before a new lock operation is issued. Typically, when an application requests an unlock operation for a file or region, the wide area application engine 26 locally marks the file or region as unlocked, but does not relay the unlock request to the remote file server 16. This local unlock is preferably assigned a relatively short expiration (such as less than 10 seconds). During the period prior to expiration, if another local lock is requested by the same user that issued the lock request, this lock operation is completed locally by the wide area application engine 26, hence saving two roundtrips over the WAN (unlock and lock). Additionally, if the wide area application engine 26 receives a lock request from a first user for a file that is locked by a second user, the wide area application engine 26 issues two operations: the original unlock operation (which was delayed in the wide area application engine), as well as the new lock request. This method of lock delegation is effective in a typical case of repeated access, and when the chances for contention over access to resources between multiple users is low.

Lock Management.

One of the reasons for the above-noted performance degradation when lock management is attempted across a WAN is a large number of lock operations performed by a software application before the user is provided access to the requested data resource. The software application, usually in cooperation with a server or an operating system that manages the data resource, needs to perform the lock operations in order to share the data resource while properly managing updates and changes to the resource. When the software application accesses the data resource over a LAN connection, it performs the lock operations relatively quickly because of the low latency and high connectivity speed of the connection, and the user usually sees fast response times. However, when the software application accesses the data resource over a slow WAN connection, the software application must perform each required lock operation remotely by sending sequences of messages over a slow communication link, and as a result the latency in response times is relatively high. Even if the WAN link has sufficient bandwidth, inherent WAN latency still causes the lock message exchange to be slow.

For example, in order to open a file for read-only access, a Microsoft® Word® word-processing application exchanges typically sixteen round trip lock operation messages with a file server that controls access to the file. When the client on which the user executes the word-processing application and the server, which controls access to the file, are coupled over a WAN connection, network latency may introduce an undesirable or even unacceptable delay in completing the file open operation because of the time needed to communicate so many lock operation messages. From the user's perspective, opening the file in the word-processing application takes too long. Similarly, saving a file with Microsoft Word involves between forty and fifty round trip lock operation messages between the client and the file server that controls access to the file. In both the file open and file save operations, the lock request messages are synchronous. That is, the client does not send the next lock request message before the response from the previous lock request message has arrived, thus creating an unacceptable delay. Furthermore, during the time that the application is waiting for exchange of lock messages to occur, the network link is underutilized by the application, further delaying the transfer of data between the client and the server.

Extended Locking.

In one aspect of the invention, a locking mechanism for a data resource operates across LANs and a WAN, for example, using the arrangement shown in FIG. 1. The technique temporarily imposes an extended lock, meaning a lock over an extended range of the file that typically exceeds the range specified by the original lock request issued by the user. While the extended lock is in force, all lock and unlock requests issued by a particular client for the resource are managed exclusively by the wide area application engine 26, which is connected to the client by a LAN. Then, once all locks held by the client have been released by the client, or after a timeout interval, the extended lock is released. This technique allows a burst of N lock and unlock requests issued by the client to be handled by no more than a single exchange across a WAN, saving N−1 round-trips. The discussion that follows references a file as an exemplary data resource, but, as noted above, the technique is applicable to other application servers as well as other data resources, especially those that allow locking of subsets of the data resources, by suitable modifications, which will be apparent to those skilled in the art.

The wide area application engine 26 receives from the client 12 a request for a lock on a file stored in the remote file server 16. This can be a composite request, which is application dependent and contain a series of requests, for example, as described above in the file access examples for Microsoft Word.

It will be recalled that conventionally, servicing such a composite lock request would result in a burst of exchanged lock and unlock messages between the client 12 and the remote file server 16 via the wide area network 22. From the perspective of the requester, that is the client 12, this results in a poor system response time.

The following description of a lock management technique according to some aspects of the invention has two main features:

(1) Upon receipt of an initial lock request from a client, which may be for a portion of a file (or other data resource), the wide area application engine 26 requests a global lock, that is an extended lock on the entire file. If this request is granted by the remote file server 16, the remote file server 16 grants the specific lock requested by the client. Any subsequent lock requests by the same user on the same file are granted by the wide area application engine 26 without further interaction with the remote file server 16.

(2) Upon receiving an unlock request from the client, typically for a portion of the file, the wide area application engine 26 grants the request without interacting with the remote file server 16. Not until all locks have been released to the client does the wide area application engine 26 issue an extended unlock request to the remote file server 16.

Figure 2:
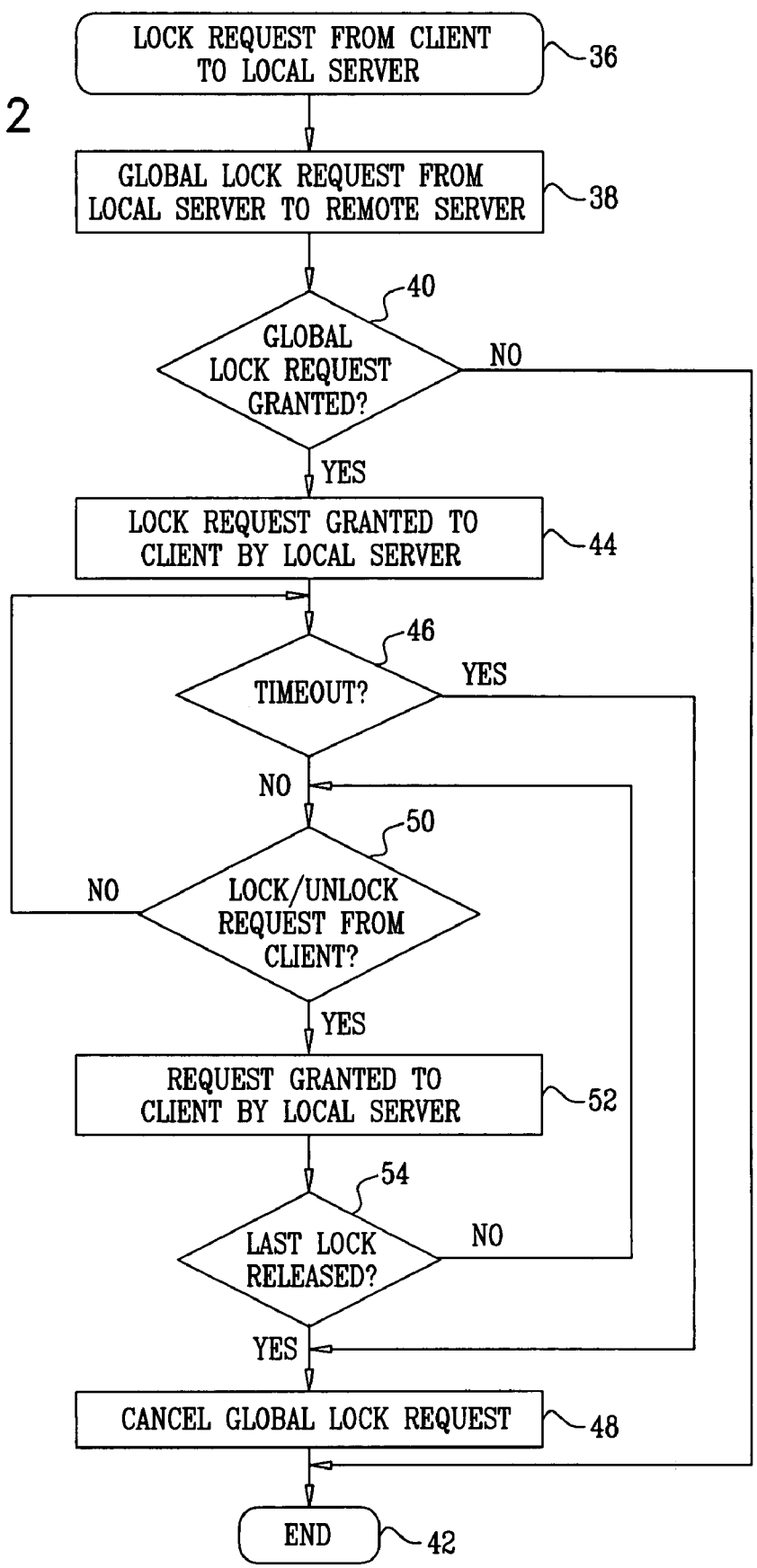
FIG. 2 is a high level flow chart of a method of lock management among networked computers in accordance with a disclosed embodiment of the invention.

Reference is now made to FIG. 2, which is a high level flow chart of a method of lock management among networked computers in accordance with a disclosed embodiment of the invention. The steps of the method are shown in a particular order for clarity of presentation. However, it will be evident to those skilled in the art that some of them can be preformed in parallel or in different orders. For convenience, the method is presented with reference to FIG. 1. At initial step 36 the wide area application engine 26, receives an initial lock request for a file from a client, e.g., The client 12. In general, the lock request is for less than the entire file. This is permissible, for example, in protocols such as NLM or CIFS.

Next, at step 38, irrespective of the range of the lock request received in initial step 36, the wide area application engine 26 issues a global lock request on behalf of the client 12 and using the credentials of the client 12. This request is preferably non-blocking to a remote server, e.g., the remote file server 16, for the entire file. In performing step 38, the wide area application engine 26 is not required to have any knowledge of the particular computer application being executed by the client 12, nor is it required to be able to predict subsequent lock/unlock request sequences for the file.

Control now proceeds to decision step 40, where it is determined if the global lock request issued by the wide area application engine 26 was granted. Since the lock request was preferably non-blocking, a nearly immediate response will generally be received from the remote file server 16 via the wide area application engines 26, 28. If the determination at decision step 40 is negative, then control proceeds to final step 42, and the procedure ends with the wide area application engine 26 relaying the original client request, unchanged. In this case, no optimization is done for this lock sequence.

If the determination at decision step 40 is affirmative, then control proceeds to step 44. The wide area application engine 26 grants the specific initial lock request that was submitted in initial step 36, using the procedures and data structures described above. The client 12, of course, is indifferent to the manner in which its initial lock request was granted. The wide area application engine 26 memorizes the fact that the lock is being held by the client 12. Subsequent lock and unlock requests made on the file will also be tracked by the wide area application engine 26.

In general, in the absence of further activity by the client, the global lock persists for a relatively short period of time, typically no more than a few seconds, so as not to interfere unduly with other users of the resource or affect concurrency. Control now proceeds to decision step 46, where it is determined if a timeout interval of inactivity on the part of the client 12 has elapsed. If the determination at decision step 46 is affirmative, then control proceeds to step 48. The wide area application engine 26 instructs the remote file server 16 to cancel the global lock request.

If the determination at decision step 46 is negative, then control proceeds to decision step 50, where it is determined if a new asynchronous lock or unlock request has been received from the client 12.

If the determination at decision step 50 is negative, then control returns to decision step 46.

If the determination at decision step 50 is affirmative, then control proceeds to step 52. The wide area application engine 26 immediately grants the request to the client 12 as in step 44, without communicating with the remote file server 16.

If in one of the iterations of decision step 50 and step 52, the last lock held by the client 12 was released, there is generally no reason for the global lock on the file to be maintained.

Control now proceeds to decision step 54, where it is determined if the last lock held by the client 12 has been released. If the determination at decision step 54 is affirmative, then control proceeds to step 48, which was described above.

If the determination at decision step 54 is negative, then control returns to decision step 50.

From inspection of FIG. 2, it will be apparent that the traffic across the WAN between the client 12 and the remote file server 16 is minimal, in comparison to the exchanges across the LAN 14 between the client 12 and the wide area application engine 26, which iterate in circuits formed by decision step 46, decision step 50, step 52, and decision step 54. During the procedure described with reference to FIG. 2, traffic across the wide area network 22, that is between the client 12 and the remote file server 16, is highly limited, while the traffic across the LAN 14, between the client 12 and the wide area application engine 26 is high.

Example 1

The following example, which is adapted from the above-noted Microsoft Word file access, will facilitate understanding of aspects of the invention. It will be understood that this is an exemplary application, and that the invention may be practiced with many different computing applications. The Microsoft Word example is helpful to illustrate the principles of the invention, because its sequence of file locking and unlocking operation is known. However, in general, the sequence is not known in advance, or cannot conveniently be determined. Nevertheless, since the principles of the invention do not depend on a priori knowledge of the lock sequence, it can be applied to achieve efficient lock management with minimum traffic across the WAN.

Figure 3:
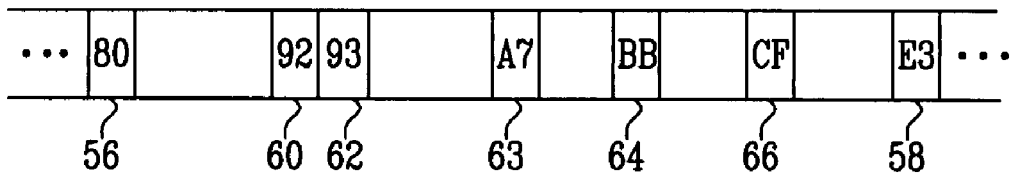
FIG. 3 is a block diagram that illustrates offsets in a file that may be locked according to a disclosed embodiment of the invention.

Reference is now made to FIG. 3, which is a block diagram that illustrates offsets in a Microsoft Word file that may be locked according to a disclosed embodiment of the invention. An offset is a value representing the number of bytes from a particular point in the file, which is also called a base. The base may be the beginning of the file, or may be any other point in the file according to a specific file format or determined by a specific application. The offsets depicted in FIG. 3 are from a hexadecimal base of "0x7FFFFF00", and are referenced as offsets 56-58. Thus, offset 56 has a hexadecimal value of "80", offset 60 has a hexadecimal value of "92", offset 62 has a hexadecimal value of "93", offset 63 has a hexadecimal value of "A7", offset 64 has a hexadecimal value of "BB", offset 66 has a hexadecimal value of "CF", and offset 58 has a hexadecimal value of "E3". According to this embodiment, in operation, a range of one or more bytes starting at each of the offsets may be locked and unlocked one or more times during the process of opening the file in response to a request from a user of the Microsoft Word application.

Figure 4:
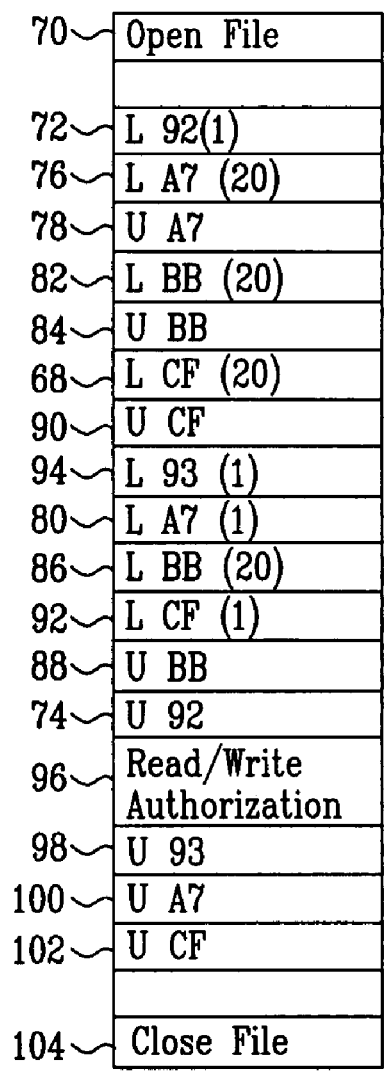
FIG. 4 illustrates a sequence of lock requests in an exemplary computer application, which are processed according to a disclosed embodiment of the invention.

Reference is now made to FIG. 4, which illustrates a sequence of lock requests in a Microsoft Word application, which are processed according to a disclosed embodiment of the invention. In general, the Microsoft Office® (MS-Office) applications use the same mechanism to open a file for concurrent working by making calls to a StgOpenStorageEx( ) method that is included in the "ole32.dll" dynamically linked library. When a Microsoft Office application opens a file, it issues the same sequence of lock requests for exclusive locks on several ranges of bytes in the file.

In FIG. 4, "L" stands for a lock request, "U" stands for an unlock request, the alphanumerical string following an "L" or an "U" is the offset (in hexadecimal notation) where a range of bytes begins, and the numeral in brackets that follows the offset indicates the number (in decimal notation) of sequential bytes that are locked. Further, as discussed above with respect to FIG. 3, the offsets depicted in FIG. 4 start from a hexadecimal base of "0x7FFFFF00" in the file. Thus, a request 68 indicates that it is a lock request ("L") for a lock on a range of bytes that starts at offset "CF" and that is 20 bytes long.

Request 70 is a request from a MS-Office application to open a file in read/write mode, i.e., for reading and writing. A sequence of subsequent lock and unlock requests follows. The sequence is encapsulated within lock request 72 and unlock request 74. Inside the sequence, a series of lock and unlock requests are issued for offsets: "A7" (requests 76, 78, 80), "BB" (requests 82, 84, 86, 88), "CF" (requests 68, 90, 92), and "93" (request 94).

Lock request 72 is a request for a lock on offset "92" in the file. Typically, when a MS-Office application first opens a file, it attempts to determine whether the file is already open by another application by trying to obtain an exclusive lock on offset "92". If the application does not succeed in obtaining a lock in response to the lock request 72, then it decides that the file is opened by a non-MS-Office application, and does not open the file at all. If lock request 72 succeeds (e.g., offset "92" was not locked), then the application issues request 76 for a lock on a range of 20 bytes starting at offset "A7". If request 76 does not succeed, it is determined that another MS-Office application is using the file and the file can be open only in read-only mode. If request 76 succeeds, the application issues the rest of the lock and unlock requests in a similar manner, namely requests 78, 82, 84, 68, 90, 94, 80, 86, 92, and 88.

Eventually, the MS-Office application issues request 74, which is an unlock request to release the lock on offset "92". When the lock on offset "92" is released, the MS-Office application presents the opened file to the user, and issues or records read/write authorization 96. At this point, the user may perform read, write, or any other operation on the file.

During any operation, the MS-Office application holds locks on offsets "93", "A7", and "CF", which offsets were obtained in response to lock requests 94, 80, and 92, respectively. When the user has completed the file operations and wants to close the file, the MS-Office application issues requests 98, 100, and 102 to release the locks on offsets "93", "A7", and "CF", respectively. The MS-Office application then processes request 104, and closes the file.

In other embodiments, a MS-Office application may use different lock sequences. For example, if the MS-Office application fails to obtain locks on offsets "93", "A7", and "CF", which are offsets from a hexadecimal base of "0x7FFFFF00", (e.g., requests 94, 80, and/or 92 have failed), but has successfully obtained a lock on offset "92" in response to request 72, the application may open the file as read-only, and the user of the application will not be allowed to write to the file. In this case, the MS-Office application may try to verify that the file is opened by another MS-Office application by sending a sequence of lock requests for locks on offsets "94", "A8", and "D0".

In another embodiment, the file may be a Microsoft Excel® (MS-Excel) workbook. In this embodiment, a flag associated with the file determines whether the file may be opened for shared use. If a file can be opened for shared use, the file is opened in a MS-Excel application and the user may work with the file. When the user decides to save any new data in the file, however, the MS-Excel application issues a sequence of lock requests for locks on offsets "93", "A7", and "CF" (which are also offsets from the hexadecimal base of "0x7FFFFF00") in a manner similar to the embodiment described above.

Based on the foregoing, it is clear that there is a variety of possible sequences of lock requests that may be determined based on a received request for a lock on a data resource. Furthermore, as mentioned above there is a variety of ways to determine what is the particular lock sequence in a given scenario or an operational context. However, the lock management technique described herein is insensitive to the sequences of lock and unlock requests issued by various Microsoft Office Applications (or other computing applications), and effectively handles all of them.

Embodiments may be implemented in operational contexts or in systems that are different from the depiction of FIG. 1. For example, in one embodiment, a client may perform the steps performed by the local proxy wide area application engine as described above. In this embodiment, the client may be connected to the remote server over a dial-up connection, DSL, an ISDN line, or any other type of slow or relatively slow communication link. Furthermore, the remote server itself may manage the file or files for which the client requests one or more locks. Moreover, embodiments may include any number of clients, servers, or resources. Thus, the techniques and approaches described herein are not limited to any particular operational context or system, and the operational context and the system depicted in FIG. 1 are to be regarded in an illustrative rather than a restrictive sense.

Figure 5:
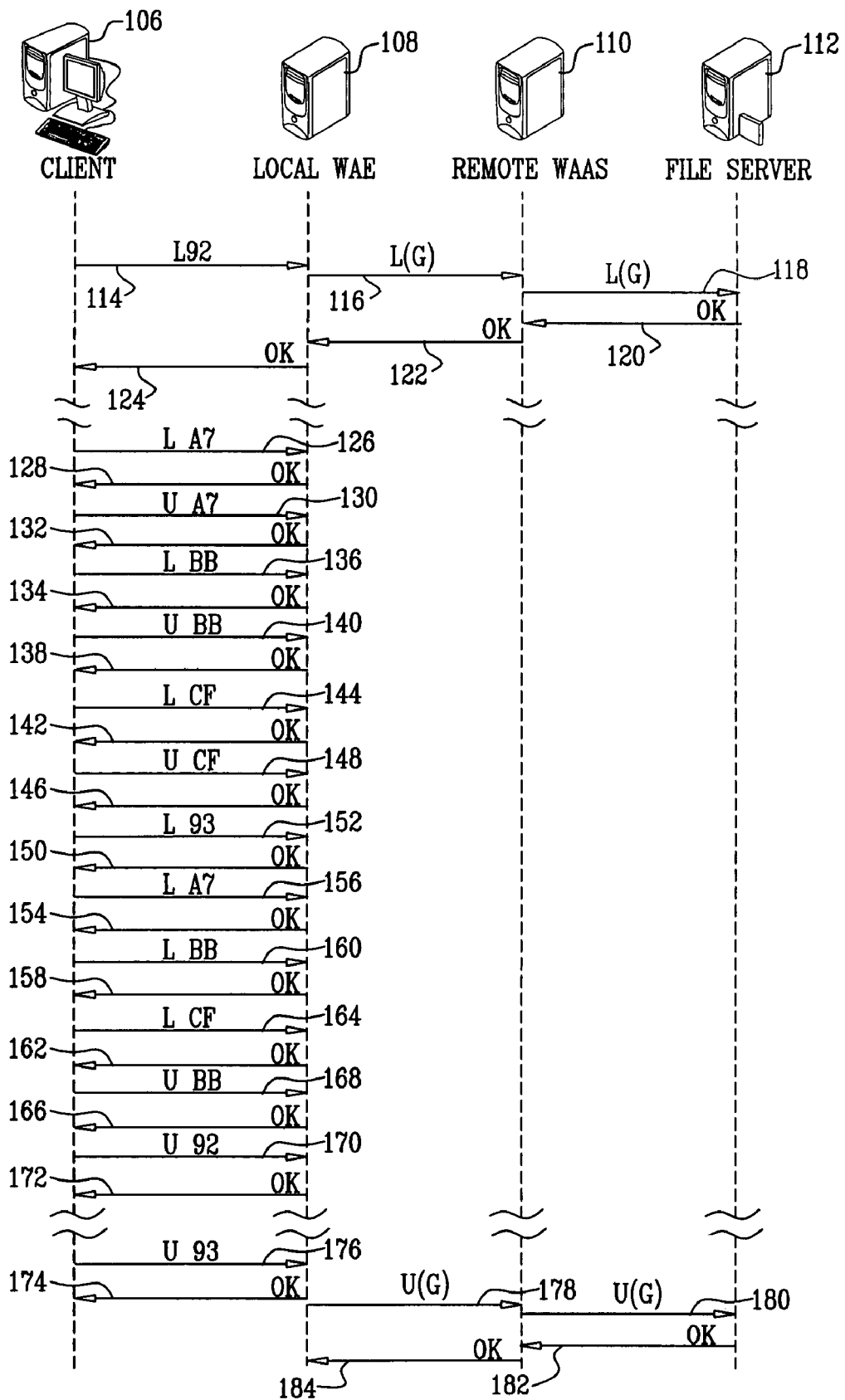
FIG. 5 is a flow diagram of a sequence of lock management messages exchanged between a client, a local proxy wide area application engine, and a remote server in accordance with a disclosed embodiment of the invention.

Reference is now made to FIG. 5, which is a flow diagram that illustrates a sequence of lock management messages exchanged between a client 106, a local proxy wide area application engine (local wide area application engine 108), a remote file server wide area application engine (remote wide area application server 110), and a file server 112 holding a remote data file, in accordance with a disclosed embodiment of the invention.

Further, the messages exchanged are in relation to the sequence of lock requests that is depicted in FIG. 4. Specifically, FIG. 5 depicts the messages exchanged when a user of the client 106 opens a file on the file server 112 for read/write access through a MS-Office application. The offsets discussed with respect to the requests depicted in FIG. 5 are from a hexadecimal base of "0x7FFFFF00" in the remote data file.

The local wide area application engine 108 receives a message 114 from the application that executes on the client 106. The message 114 includes a request for a lock on offset "92" of the file.

The local wide area application engine 108 then sends a message 116 to the remote wide area application server 110, which is a lock request that the entire file be locked, indicated by the notation (G). The remote wide area application server 110 thereupon sends a message 118 to the file server 112, relaying the global lock request that it received from the local wide area application engine 108.

Upon receipt of the message 118, the file server 112 grants the lock in a response message 120 to the remote wide area application server 110. The remote wide area application server 110 then sends the global lock to the local wide area application engine 108 in a message 122.

Storing the global lock on the file, the local wide area application engine 108 is now poised to handle a sequence of lock requests from the client 106 without further communication with the remote wide area application server 110 or the remote file server 112. The requested lock on offset "92" is granted to the client 106 in a message 124.

According to the sequence of lock requests depicted in FIG. 4, the client 106 issues a sequent of requests for locks on offsets "92", "93", "A7", "BB", and "CF" These locks can be immediately granted by the local wide area application engine 108 (In FIG. 5, some of these exchanges are omitted for reasons of brevity.).

Then, when the local wide area application engine 108 receives a request 126 for a lock on offset "A7". It immediately grants the lock in a message 128. Next, in response to a message 130 from the client 106 to release the lock on offset "A7", the local wide area application engine 108 sends a message 132 to the client 106, indicating that the lock on offset "A7" was released.

In a similar manner, the local wide area application engine 108 performs the following steps: grants in a message 134 a lock on offset "BB" that was requested in message 136, and releases the lock in a message 138 in response to receiving a message 140; grants in a message 142 a lock on offset "CF" that was requested in a message 144, and releases the lock in a message 146 in response to receiving a message 148; grants in a message 150 a lock on offset "93" that was requested in a message 152; grants in a message 154 a lock on offset "A7" that was requested in a message 156; grants in a message 158 a lock on offset "BB" that was requested in a message 160; grants in a message 162 a lock on offset "CF" that was requested in a message 164; and releases the lock held by the application on offset "BB" in a message 166 in response to receiving from the client 12 a message 168.

At this point the application executing on the client 106 holds locks on offsets "93", "A7", and "CF", and needs this set of locks to allow the user to perform read/write operations on the file. According to the locking semantics of MS-Office applications, the application must release the lock on offset "92" of the file, before it grants a read/write authorization to its user. Thus, the client 106 sends a message 170 to the local wide area application engine 108 containing a request to release the lock on offset "92". The local wide area application engine 108 immediately grants this request in a message 172 to the client 106. Upon receiving the message 172, the client 106 knows that it has read/write authorization on the file. Notice that even though the local wide area application engine 108 responds immediately to client lock requests, it still propagates the original lock requests to the file server 112 (via the remote wide area application server 110) to ensure the regions are locked, in an event that the extended locks need to be released.

Similarly to propagating lock requests in the background, the local wide area application engine 108 also propagates unlock requests in the background. The release of the global lock does not occur immediately, but after a defined timeout (typically a few seconds). The release of the global lock allows other clients to view the file in a read-only mode.

Eventually, the application closes the file, following a sequence of requests, which are not repeated here. The last lock held by the application is a lock on the offset "93". The local wide area application engine 108 releases the lock held by the application on offset "93" in a message 174 in response to receiving from the client 106 a message 176.

The local wide area application engine 108 then sends a message 178 to the remote wide area application server 110, which is an unlock request that the entire file be unlocked, again indicated by the notation (G). The remote wide area application server 110 thereupon sends a message 180 to the file server 112, relaying the global lock request that it received from the local wide area application engine 108. The extended lock release (unlock) (message 178) is an extra message. Prior to this, there was a specific unlock message 176, pertaining to offset "93".

Upon receipt of the message 180, the file server 112 releases the global lock in a response message 182 to the remote wide area application server 110. The remote wide area application server 110 then relays the release of the global lock to the local wide area application engine 108 in a message 184.

Extended Locking

Alternate Embodiment

The extended locking management technique described above can be refined in an alternate embodiment of the invention. In this embodiment, instead of locking a whole file, a regional lock is placed only on those regions affected by a burst of lock and unlock requests issued by the client. The rationale for this strategy is that in many cases such bursts follow a consistent pattern: sometimes affected ranges are colocated in the file (e.g., all records of a give table, each record locked separately), in other times the bursts are directed to gaining exclusive access to a particular region (as in Microsoft Office). This embodiment retains the advantage of reducing roundtrips, and further minimizes the impact on concurrent access by other users to unrelated areas in the file.

In some versions, the scope of a regionally extended lock is predicted, based on history, or knowledge of the application from which the burst originates. Indeed, the scope may vary adaptively. In the case of a misprediction, individual lock requests outside the scope of the regionally extended locks are simply forwarded to the origin file server. While this may cause some performance degradation, correctness is not affected.

The reduction of the scope of an extended lock region to fit the range of the burst can be done in two ways:

The system can be configured manually, so that a lock request L1 made on a range R1 would trigger a regionally extended lock EL2 of a range R2 that covers the predicted burst of locks associated with the request L1. This method requires developers to learn burst behaviors and manually configure the system.

Alternatively, a monitor automatically observes ranges of locks associated with bursts, and responsively to the observations made by the monitor the ranges of corresponding regionally extended locks are adaptively configured. That is, a short-term history of burst ranges is used to predict future burst ranges. Extended regional locking requests are serviced according to the predictions.

Figure 6:
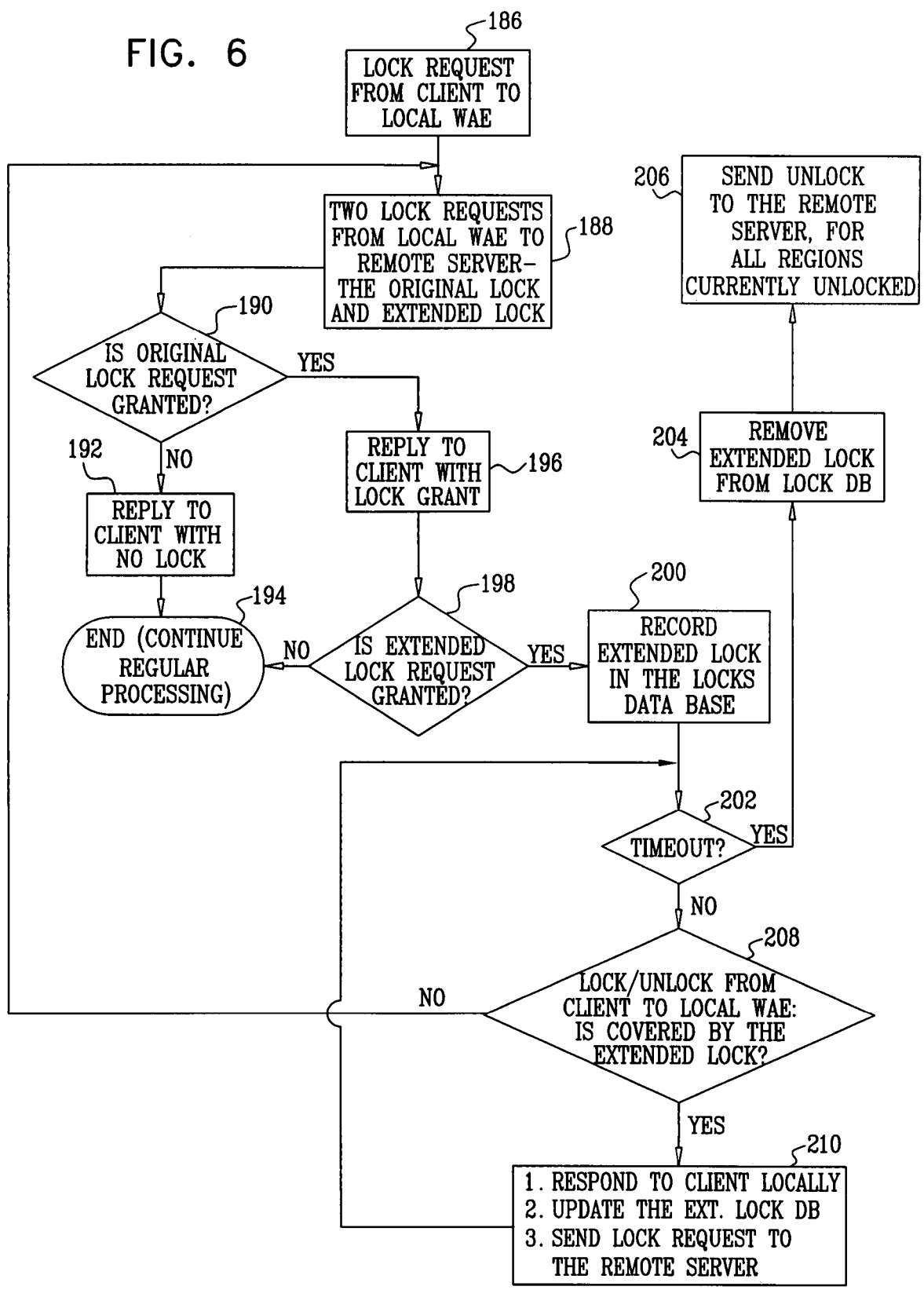
FIG. 6 is a flow chart of a method of managing regionally extended locks in accordance with an alternate embodiment of the invention.

Reference is now made to FIG. 6, which is a flow chart of a method of managing regionally extended locks in accordance with a disclosed embodiment of the invention. At initial step 186 a client, e.g., the client 12 (FIG. 1) issues a lock request, which is intercepted and handled by a local server, e.g., the wide area application engine 26 in a WAAS supported system.

Next, at step 188, the local wide area application engine issues two lock requests to a remote server on which the relevant file is stored, or otherwise controlled: (1) the lock request as issued by the client, and (2) a regionally extended lock that covers a specified range, including the range specified in by the client's lock request.

Control now proceeds to decision step 190, where it is determined if the client's original lock request was granted by the remote server. If the determination at decision step 190 is negative, then control proceeds to step 192. A message is transmitted to the client indicating that the requested lock was not granted. Normal processing continues at final step 194.

If the determination at decision step 190 is affirmative, then control proceeds to step 196. A message is transmitted to the client indicating that the requested lock was granted.

Control now proceeds to decision step 198, where it is determined if the regionally extended lock requested in step 188 was granted. If the determination at decision step 198 is negative, then control proceeds to final step 194, and normal processing continues (no optimizations are made).

If the determination at decision step 198 is affirmative, then control proceeds to step 200. The regionally extended lock is marked as being active. Typically, a lock database is maintained for this purpose, which includes an expiration time for the new regionally extended lock.

Control now proceeds to decision step 202, where it is determined if timeout has occurred, that is whether the current regionally extended lock has expired. If the determination at decision step 202 is affirmative, then control proceeds to step 204. All indications that the regionally extended lock is currently in force are removed on the remote server. Then, at final step 206 a request is transmitted to the remote server to remove the current regionally extended lock.

If the determination at decision step 202 is negative, then control proceeds to decision step 208, where it is determined if a new lock or unlock request has been transmitted from the client to the local server.

The local wide area application engine inspects the lock requests to se if the range requested is covered by any of the extended locks issued by the same user. If the determination at decision step 208 is negative, then control flows to returns to step 188, and the local wide area application engine performs the sequence of extended locks.

If the determination at decision step 208 is affirmative, then control proceeds to step 210, where action on the new request is taken by the local wide area application engine. A response indicating granting of the request is sent to the client. The expiration of the current regionally extended lock is extended. A lock request is also sent by the local wide area application engine to the remote server. However, this lock request can be sent asynchronously, since the server protects the region. Thus, the client still experiences normal LAN response time from its local wide area application engine while the original lock request propagates to the server. The original lock request needs to be sent to the server because in case the local wide area application engine needs to release the extended locks (e.g., due to timeout), the originally requested locks should still be issued at the remote server to protect the data. The implication is that in step 204, extended lock removal occurs only after all pending asynchronous lock requests have propagated to the server and the acknowledgement have arrived at the local wide area application engine. This prevents a situation in which early removal of extended locks before arrival of the original lock request might expose data in the range of the original request, now unprotected.

After performing step 210, control returns to decision step 202.

Selective Delayed Unlock.

Referring again to FIG. 5, in another embodiment of the lock mechanism, an extended lock may be selectively released. This method incurs the exchange of more messages between the local wide area application engine 108 and the remote wide area application server 110, but there is no degradation of response from the perspective of the client 106.

Figure 7:
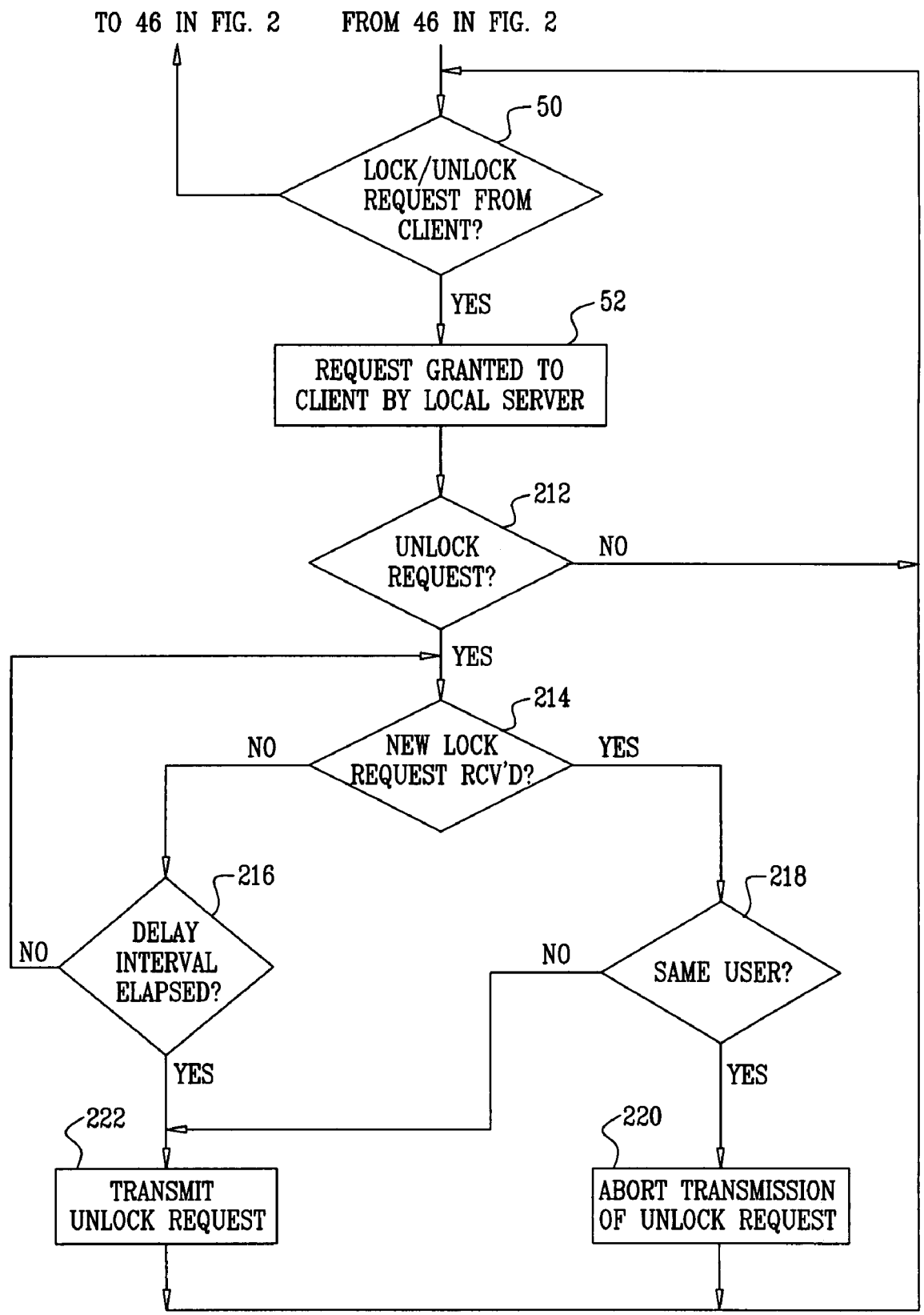
FIG. 7 is a flow chart of a method of selective delayed unlocking in accordance with an alternate embodiment of the invention.

Reference is now made to FIG. 7, which is a fragmentary flow chart of a method of selective delayed unlocking in accordance with an alternate embodiment of the invention. In some respects, the method is similar to the method described above in FIG. 2. It is assumed that steps 36, 38, 40, 44, 46, and decision step 46 have been performed, the details of which are not repeated. Furthermore, the determination at decision step 50 is assumed to be affirmative. Step 52 is then performed as described above, and from the perspective of the requesting application, its request has been satisfied. The following process steps are again shown in a linear sequence. However, it will be evident that many of them can be performed in parallel, asynchronously, or in different orders, and that more than one instance of the method may be performed concurrently.

Control now proceeds to decision step 212, where it is determined if the request processed is an unlock request. If the determination at decision step 212 is negative, it is concluded that a lock request was processed, and no further action is needed. Control returns to decision step 50 to await a new request from the client 106.

If the determination at decision step 212 is affirmative, it is desirable to transmit the unlock request to the file server 112 via the remote wide area application server 110 to release at least a portion of the locked resource for use by others. However, a delay loop is executed, during which communication of the unlock request by the local wide area application engine 108 to the remote wide area application server 110 is held in abeyance.

Control now proceeds to decision step 214, where it is determined if a new lock request for the file has been received. It will be seen from the description that follows that such an event profoundly affects the sequence of subsequent lock management communications directed to the file server 112.

If the determination at decision step 214 is negative, then control proceeds to decision step 216, which is discussed below.

If the determination at decision step 214 is affirmative, then at decision step 218 it is determined whether the same user that made the initial request (initial step 36, FIG. 2) has made the current request.

If the determination at decision step 218 is affirmative, then at step 220, the pending communication of the unlock request to the file server 112 via the remote wide area application server 110 is aborted, as the user still requires the resource. In practice, the unlock request is simply removed from a queue of pending communications. Control then returns to decision step 50.

If the determination at decision step 218 is negative, then it is necessary to transmit the pending unlock request immediately. Otherwise, the new user is at risk for receiving an error message from the remote wide area application server 110, e.g., a "lock not granted" error, without a clear explanation. This is accomplished in step 222. Control then returns to decision step 50.

If the determination at decision step 214 is negative, then control proceeds to decision step 216, where it is determined if a delay interval has expired. The delay interval is system dependent.

If the delay interval has not yet expired, control returns to decision step 214. If the delay interval has expired, then, at step 222, the pending unlock request is transmitted by the local wide area application engine 108 to the remote wide area application server 110, after which the lock is released by the file server 112. Control then returns to decision step 50.

Although embodiments of the present invention have been described with respect to interception of network file system protocol requests, some aspects of the present invention can be implemented using file system drivers accessible by local network clients.

Furthermore, although embodiments are described herein with reference to certain communication protocols, programming languages and file systems, the principles of the invention may similarly be applied using other protocols, languages and file systems. It will thus be appreciated by persons skilled in the art that the invention is not limited to what has been particularly shown and described hereinabove. Rather, the scope of the invention includes both combinations and subcombinations of the various features described hereinabove, as well as variations and modifications thereof that are not in the prior art, which would occur to persons skilled in the art upon reading the foregoing description.

The invention claimed is:

1. A computer-implemented method for accessing a data resource by a client, comprising the steps of:
   receiving across a local area network a first request from said client to lock a first portion of said data resource;
   responsively to said first request, communicating across a wide area network to impose an extended lock on said data resource that reserves a range of said data resource for access thereof by said client; and
   while avoiding modifying said extended lock by communication across said wide area network, performing the steps of:
   issuing a grant of said first request to said client across said local area network;
   thereafter receiving across said local area network a second request from said client to unlock a second portion of said data resource within a range of said extended lock;
   issuing a grant of said second request to said client across said local area network;
   awaiting, during a delay interval, a third request from said client across said local area network to lock a third portion of said local area network; and
   in an event that said third request is not received, communicating a second time across said wide area network to cancel only a portion of said extended lock that corresponds to said second portion of said data resource.

2. The method according to claim 1, wherein said first portion of said data resource is less than all of said data resource.

3. The method according to claim 2, wherein said range is all of said data resource.

4. The method according to claim 2, wherein said range exceeds said first portion of said data resource and is less than all of said data resource.

5. A computer-implemented method for accessing a data resource by a client on a first local area network, which is held on a file server on a second local area network, comprising the steps of:
   intercepting in a local server a first request from said client to lock a first portion of said data resource, said local server being connected to said first local area network;
   responsively to said first request, transmitting a first message via a wide area network from said local server to a remote server that is connected to said second local area network, requesting an extended lock on said data resource, said extended lock reserving all of said data resource for access thereof by said client;
   receiving a second message from said remote server by said local server granting said extended lock;
   responsively to said second message, issuing a grant of said first request to said client by said local server;
   thereafter intercepting in said local server a second request from said client to lock a second portion of said data resource within a range of said extended lock;

responsively to said second request, while said extended lock is in force issuing a grant of said second request to said client by said local server;

intercepting in said local server a third request from said client to unlock said first portion of said data resource;

responsively to said third request and while said extended lock is in force, issuing a grant of said third request to said client by said local server;

after intercepting said third request queuing a third message in said local server requesting that said first portion of said data resource be unlocked; and after elapse of a delay interval transmitting said third message via said wide area network from said local server to said remote server.

6. The method according to claim 5, further comprising the steps of:

after intercepting said third request queuing a third message in said local server for a delay interval requesting that said first portion of said data resource be unlocked; and during said delay interval intercepting in said local server a fourth request from said client to lock a third portion of said data resource; and responsively to said fourth request, canceling said third message.

7. The method according to claim 5, further comprising the steps of:

after intercepting said third request queuing a third message in said local server for a delay interval requesting that said first portion of said data resource be unlocked; and during said delay interval intercepting in said local server a fourth request from another client to lock a third portion of said data resource; and responsively to said fourth request, transmitting said third message via said wide area network from said local server to said remote server prior to elapse of said delay interval.

8. The method according to claim 5, wherein said first message comprises a non-blocking lock request for said extended lock.

9. The method according to claim 5, further comprising the steps of:

intercepting at least one additional request in said local server from said client to release all locks on said data resource being held in favor or said client; and thereafter transmitting a cancellation message via said wide area network from said local server to said remote server to release said extended lock on said data resource.

10. The method according to claim 5, wherein said data resource is a file.

11. A computer software product accessing a data resource by a client on a first local area network, which is held on a file server on a second local area network, including a computer-readable medium in which computer program instructions are stored, which instructions, when read by a computer connected to said first local area network, cause the computer to:

intercept a first request from said client to lock a first portion of said data resource;

transmit a first message via a wide area network to a remote server that is connected to said second local area network, requesting an extended lock on said data resource, said extended lock reserving a range of said data resource for access thereof by said client;

receive a second message from said remote server granting said extended lock;

issue, responsively to said second message, a grant of said first request to said client;

intercept thereafter a second request from said client to lock a second portion of said data resource within a range of said extended lock;

issue, responsively to said second request, and while said extended lock is in force, a grant of said second request to said client;

intercept a third request from said client to unlock said first portion of said data resource;

issue, responsively to said third request, and while said extended lock is in force, a grant of said third request to said client;

after intercepting said third request, queue a third message requesting that said first portion of said data resource be unlocked; and transmit, after elapse of a delay interval, said third message via said wide area network to said remote server.

12. The computer software product according to claim 11, wherein said first portion of said data resource is less than all of said data resource.

13. The computer software product according to claim 11, wherein said range is all of said data resource.

14. The computer software product according to claim 11, wherein said range exceeds said first portion of said data resource and is less than all of said data resource.

15. The computer software product according to claim 11, wherein said computer is further instructed to:

after intercepting said third request, store a third message for a delay interval requesting that said first portion of said data resource be unlocked; and intercept, during said delay interval, a fourth request from said client to lock a third portion of said data resource; and cancel, responsively to said fourth request, said third message.

16. The computer software product according to claim 11, wherein said computer is further instructed to:

after intercepting said third request, store a third message for a delay interval requesting that said first portion of said data resource be unlocked; and intercept, during said delay interval, a fourth request from another client to lock a third portion of said data resource; and transmit, responsively to said fourth request, said third message via said wide area network to said remote server prior to elapse of said delay interval.

17. The computer software product according to claim 11, wherein said computer is further instructed to:

intercept at least one additional request from said client to release all locks on said data resource being held in favor or said client; and transmit thereafter a cancellation message via said wide area network to said remote server to release said extended lock on said data resource.

18. A networked server for enabling access to a data resource by a client on a first local area network, which is held on a file server on a second local area network, comprising:

a first interface to said first local area network;

a second interface to a wide area network; and one or more processors configured to:

intercept via said first interface a first request from said client to lock a first portion of said data resource;

transmit a first message via said second interface to a remote server that is connected to said second local area network, requesting an extended lock on said data resource, said extended lock reserving a range of said data resource for access thereof by said client;

receive via said second interface a second message from said remote server granting said extended lock;

issue, responsively to said second message, a grant of said first request to said client via said first interface;

intercept thereafter via said first interface a second request from said client to lock a second portion of said data resource within a range of said extended lock;

issue, via said first interface, responsively to said second request, while said extended lock is in force and while avoiding communication with said remote server, a grant of said second request to said client;

intercept via said first interface, while said extended lock is in force, a third request from said client to unlock said first portion of said data resource;

issue via said first interface, responsively to said third request and while avoiding communication with said remote server, a grant of said third request to said client;

queue, after intercepting said third request, a third message requesting that said first portion of said data resource be unlocked; and transmit, after elapse of a delay interval, said third message to said remote server via said second interface.

19. The server according to claim 18, wherein said first portion of said data resource is less than all of said data resource.

20. The server according to claim 18, wherein said range is all of said data resource.

21. The server according to claim 18, wherein said range exceeds said first portion of said data resource and is less than all of said data resource.

22. The server according to claim 18, wherein said one or more processors are operative to:

after intercepting said third request, store a third message for a delay interval requesting that said first portion of said data resource be unlocked;

intercept via said first interface, during said delay interval, a fourth request from said client to lock a third portion of said data resource; and cancel, responsively to said fourth request, said third message.

23. The server according to claim 18, wherein said, one or more processors are operative to:

after intercepting said third request, store a third message for a delay interval requesting that said first portion of said data resource be unlocked;

intercept via said first interface, during said delay interval, a fourth request from another client to lock a third portion of said data resource; and transmit, responsively to said fourth request, said third message via said second interface to said remote server prior to elapse of said delay interval.

24. The server according to claim 18, wherein said one or more processors are operative to:

intercept via said first interface at least one additional request from said client to release all locks on said data resource being held in favor or said client; and transmit thereafter a cancellation message via said second interface to said remote server to release said extended lock on said data resource.

* * * * *